United States Patent [19]
Andressen

[11] Patent Number: 6,060,703
[45] Date of Patent: May 9, 2000

[54] COAXIAL UNFOCUSED OPTICAL SENSOR FOR DUAL MODE SEEKERS

[75] Inventor: Clarence C. Andressen, Clearwater, Fla.

[73] Assignee: Alliant Defense Electronics Systems, Inc., Clearwater, Fla.

[21] Appl. No.: 09/107,009

[22] Filed: Jun. 29, 1998

[51] Int. Cl.[7] .......................... H01Q 21/280; H01Q 19/00
[52] U.S. Cl. ........................ 250/203.6; 343/720; 343/725
[58] Field of Search .................. 250/203.6, 332, 250/347; 342/53, 363, 365; 343/720, 725

[56] References Cited

U.S. PATENT DOCUMENTS

| | | | |
|---|---|---|---|
| 4,108,400 | 8/1978 | Groutage et al. ....................... | 244/3.15 |
| 4,264,907 | 4/1981 | Durand et al. ............................... | 343/6 |
| 4,307,404 | 12/1981 | Young ..................................... | 343/754 |
| 4,636,797 | 1/1987 | Saffold .................................... | 343/725 |
| 4,652,885 | 3/1987 | Saffold et al. ........................... | 343/725 |
| 4,698,638 | 10/1987 | Bramogam et al. .................... | 343/725 |
| 4,866,454 | 9/1989 | Droessler et al. ....................... | 343/725 |
| 5,182,564 | 1/1993 | Burkett et al. ............................. | 342/53 |
| 5,214,438 | 5/1993 | Brusgard et al. ........................ | 343/725 |
| 5,307,077 | 4/1994 | Branigan et al. ........................ | 340/720 |
| 5,681,009 | 10/1997 | Vandersteen et al. ................... | 250/347 |
| 5,973,649 | 10/1999 | Andressen ................................ | 343/720 |

*Primary Examiner*—Stephone B. Allen
*Attorney, Agent, or Firm*—Vidas, Arrett & Steinkraus

[57] ABSTRACT

The present invention is directed to an unfocused optical sensor including a dual mode optical and radio frequency (RF) sensor system for use with a guidance system of a munition. The inventive system comprises an optical sensor comprising a plurality of optical detector units. The optical detector units each produce an optical detector output signal upon illumination with optical energy. In a dual mode embodiment, the sensor may further comprise an optional rf sensor which produces an rf sensor output signal. In the case of the dual mode sensor, the optical detector units are arranged in an annulus mounted coaxially with the transreflector and twist reflector about the longitudinal axis of the munition. The sensor system further comprises a signal processor operably associated with the optional rf sensor and the optical sensor to receive the rf sensor and optical detector output signals and provide a guidance signal to the guidance system.

30 Claims, 5 Drawing Sheets

COAXIAL UNFOCUSED OPTICAL SENSOR FOR DUAL MODE SEEKERS

BACKGROUND OF THE INVENTION

The present invention is directed to an optical sensor which may be used in conjunction with a radio frequency (rf) sensor as part of a dual mode sensor. More particularly, this invention relates to a dual mode millimeter wave and optical sensor system for use with a guidance system of a projectile.

Dual mode sensors are increasingly employed in conjunction with the guidance systems of munitions to improve operational flexibility and resistance to countermeasures. A number of approaches have been taken in designing such dual mode sensors.

In one approach called 'common aperture' and often seen in aperture-limited applications such as munitions and covert sensors, a common aperture is shared by the radio frequency (rf) sensor and the optical sensor so as to allow each sensor to collect the maximum incoming energy. To that end, U.S. Pat. No. 5,214,438 discloses a millimeter wavelength (mmw) and infrared sensor having a common receiving aperture. U.S. Pat. No. 4,866,454 similarly discloses a multi-spectral imaging system having a common aperture. Other representative patents include U.S. Pat. No. 4,652,885 and U.S. Pat. No. 4,636,797 which both disclose a dual mode antenna in which mmw and infrared energy enter a common aperture and propagate through a common transmission device to a point where the energies of respective wavelength are divided for subsequent processing. "Common Aperture Dual Mode Semi-Active Laser/Millimeter Wave Sensor" a U.S. patent application Ser. No. 08/959,602 filed Oct. 28, 1997, now U.S. Pat. No. 5,973,649, the entire contents of which are incorporated herein by reference describes yet another approach to a dual mode single aperture sensor which uses a pyramid with surfaces selectively coated to reflect semi-active laser energy and selectively passes mmw energy.

Unfortunately, common aperture dual mode sensors typically result in decreased sensitivity and decreased accuracy for both modes. Elements that are used by both the mmw and optical sensors must either be broadband to encompass both operating wavelengths thereby decreasing sensitivity or have selective coatings to selectively pass one wavelength while reflecting the other. Where it is desired to use such dual mode sensors on high speed munitions, the design problems are exacerbated as many of the coatings and other materials useful for single aperture constructions are not robust enough to operate at high speeds where frictional heating becomes significant.

In another approach to the dual mode sensor called 'separate aperture', separate apertures are employed for each wavelength band. U.S. Pat. No. 5,182,564 to Burkett et al. discloses one such device in which a mmw rf microstrip array is embedded within an infrared reflector assembly. U.S. Pat. No. 4,264,907 to Durand, Jr. et al. discloses a seeker system on a missile comprising an infrared sensor and an rf sensor. The dual mode seeker employs two rf antennae emanating from the missile. U.S. Pat. No. 4,108,400 to Groutage et. al. also discloses a dual mode guidance system having two separate apertures for detecting energy. The rf sensors are disposed on the skin of a missile about an alternate sensor. U.S. Pat. No. 4,698,638 to Branigan et al. discloses a dual mode target seeking system comprising an rf antenna and an electro-optical processing system extending through the rf antenna.

Where wavelengths in excess of mmw are detected, an optical sensor may be placed in front of the rf sensor without significantly interfering in the operation. In the case of mmw, however, the blockage of the center of the rf sensor by the electro-optical sensor can degrade the resolution of the rf sensor. While this problem can be minimized by reducing the size of the optical sensor, this in turn reduces the sensitivity and range of the optical sensor.

It is a goal of the present invention to provide an unfocused optical sensor which may be used in conjunction with an rf sensor as part of a dual mode sensor that overcomes the problems of the prior art devices. The inventive dual mode sensors have an inner mmw rf sensor surrounded by an unfocused optical sensor and can be used in conjunction with the guidance system of a munition.

For the purposes of this disclosure, the term 'munition' is to be understood in its generic sense which includes projectiles, and ammunition including bullets, missiles and rockets. Also, for the purposes of this application, the term 'target source of optical energy' shall refer to any source of reflected optical energy, i.e. any optical energy reflected off of a target.

SUMMARY OF THE INVENTION

The present invention is directed to a sensor for use with a target measurement system such as a guidance system of a munition. The sensor is mounted on the munition and comprises a plurality of optical detector units disposed, preferably symmetrically disposed, about a common point along the longitudinal axis of the munition. The optical detector units, situated at a distance from the longitudinal axis, may receive incoming optical energy. Each optical detector unit that receives incoming optical energy produces an optical detector output signal. The sensor further comprises one or more light blocking devices arranged in a substantially circular shape around the common point. The light blocking devices are situated closer to the target source of optical energy than the optical detector units and are constructed and arranged so as to block at least a portion of any incoming optical energy propagating in a direction oblique to the longitudinal axis, from one or more of the optical detector units. Preferably, the one or more light blocking devices are reflecting and are arranged so as to reflect incoming optical energy onto at least one or more of the optical detector units. A signal processor is operably associated with the optical detector units to receive the optical detector output signals from those optical detector units which are illuminated and provides a target measurement signal to the target measurement system. Where the target measurement system is a guidance system, a guidance signal is provided to the guidance system.

Preferably, the sensor comprises an even number of optical detector units.

The inventive sensor, in a dual mode embodiment, may further comprise an rf sensor to receive rf energy and produce an rf sensor output signal. The signal processor is operably associated with the rf sensor to receive the rf sensor output signal and, in conjunction with the optical detector output signals, provide a guidance signal to the guidance system.

The present invention is also directed to a dual mode optical and radio frequency sensor system for use with a guidance system of a munition. The sensor system is mounted on the munition and comprises an rf sensor to receive rf energy and produce an rf sensor output signal, and an rf transparent radome mounted over the rf sensor and coaxial with the rf sensor. The system further comprises an optical sensor comprising optical detector units mounted coaxially with the rf sensor to substantially form an annulus of optical detector units to receive optical frequency energy and produce optical detector output signals. An annular optically transparent radome is mounted over the optical detector units and is coaxial with the optical detector units. Mounted within the optical radome and coaxially about the rf sensor is a light blocking device to block at least a portion of any incoming optical energy propagating in a direction oblique to the longitudinal axis from one or more of the detectors. The sensor system also comprises a signal processor operably associated with the rf sensor and the annular optical detector to receive the rf sensor output signal and the optical detector output signal(s) and provide a guidance signal to the guidance system.

Preferably, the light blocking device is reflecting, constructed and arranged to direct optical radiation to the optical detector units.

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated.

Figure 1:
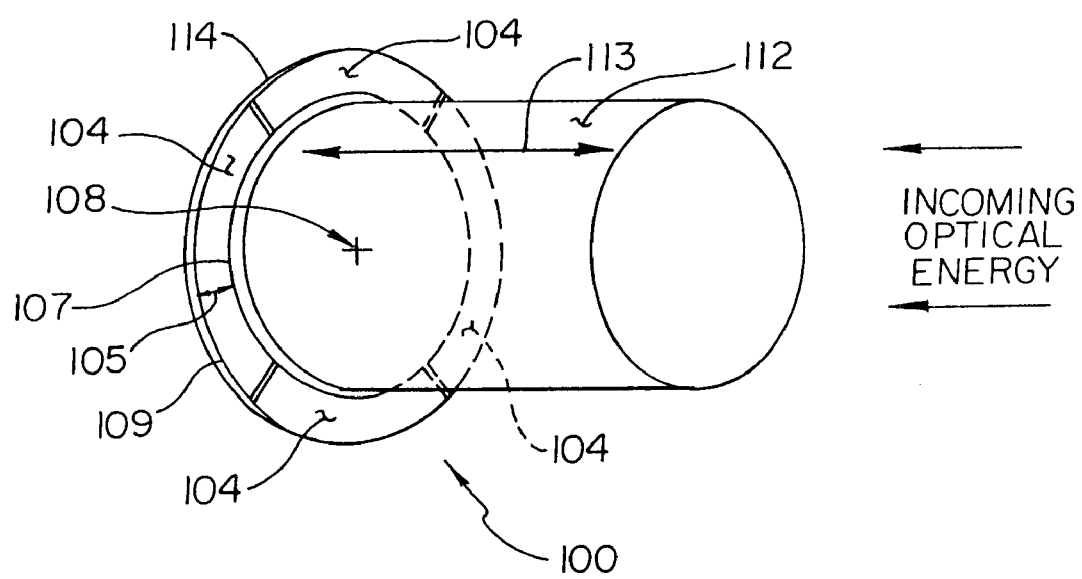
FIG. 1 is a perspective view of one embodiment of the inventive optical sensor.

The sensor system of the present invention is intended for use as a target measurement device mounted on a munition or other suitable support system. As seen in FIG. 1, an optical sensor, shown generally at 100, comprises a plurality of optical detector units 104. Each of the optical detector units 104, when illuminated with optical energy of the appropriate frequency, produce an optical detector output signal. Optical detector units 104 are disposed, preferably symmetrically disposed in an annulus 114, about a common point 108. One or more light blocking devices 112 are arranged in a substantially circular shape around common point 108. Light blocking device, shown as cylinder 112 are constructed and arranged so as to block at least a portion of any incoming optical energy propagating in a direction oblique to the longitudinal axis of the munition from one or more of the optical detector units 104. The sensor system further comprises a signal processor 248 (shown in FIG. 2) operably associated with the optical detector units to receive the optical detector output signals and provide a guidance signal to the guidance system.

Although not essential, the sensor desirably comprises an even number of optical detector units. It is more desirable that the system comprise at least four optical detector units. The accuracy of the sensor increases with the number of optical detector units. In a preferred embodiment, the sensor contains eight optical detector units. Optionally, each optical detector unit may be formed of two or more smaller optical detectors slaved together to produce one optical detector output signal. Each optical detector unit, whether consisting of a single optical detector or several optical detectors slaved together, is operably associated with the signal processor. As such, the signal processor has 'n' channels, where 'n' corresponds to the number of optical detector units.

While it is preferable that the light blocking device(s) have a substantially circular cross-section, other cross-sectional shapes may be used as well, such as an ellipse or a square. In the preferred embodiment of FIG. 1, the light blocking device is cylindrical.

The light blocking device is desirably reflecting, made of aluminum or aluminized Mylar, so as to reflect impinging optical energy outward onto one or more optical detector units and thereby increase the signal reaching the illuminated optical detector units. Where the light blocking device is reflecting, it is desirable, although not necessary that it be uniformly reflecting. Other possibilities for a reflective light blocker include a light blocker with evenly spaced reflective strips.

Further, it is desirable that the light blocking device be oriented normal or nearly normal to the plane of the optical detector units, as shown in FIG. 1. In the former case, a cylindrical reflector is preferred. Where the light blocking device is reflecting, this angular relationship becomes more important as less light will be reflected onto the detectors as the angle between the plane of the optical detector units and the reflecting surface of the light blocking device becomes obtuse. Of course, the exact angle of the light blocking device relative to the detectors will depend on the geometrical constraints imposed by the frame on which the sensor is mounted. Where, for example, the sensor is mounted on a bullet, aerodynamic or other considerations may dictate an obtuse angle between the detectors and the reflecting surface of the light blocking device.

In a preferred embodiment, the optical detector units will be arc shaped and arranged in an annulus around a cylindrical, reflecting light blocking device as shown in FIG. 1. With reference to FIG. 1, the length of light blocking device 112, as designated by reference numeral 113, is from about 1 to about 50 times the width of the optical detector units 104, designated by reference numeral 105 and defined to be the distance between inner arc 107 and outer arc 109 of a detector 104. It is desirable that the ratio of length 113 to width 105 be from about 1:1 to about 10:1 and more desirable that the ratio be from about 2:1 to about 4:1. It is even more desirable that the ratio be from about 2:1 to about 3:1.

The ratio of the length of the reflector to the width of the optical detector units will determine the angular field of view of the optical sensor. In the case where the optical sensor comprises an annulus of optical detector units and a cylindrical reflector disposed interior to and abutting the annulus, the field of view will be given by the inverse tangent of the ratio of the length of the reflector to the width (that is, the difference between the length of the outer radius of an optical detector unit and the inner radius of an optical detector unit.

Figure 2:
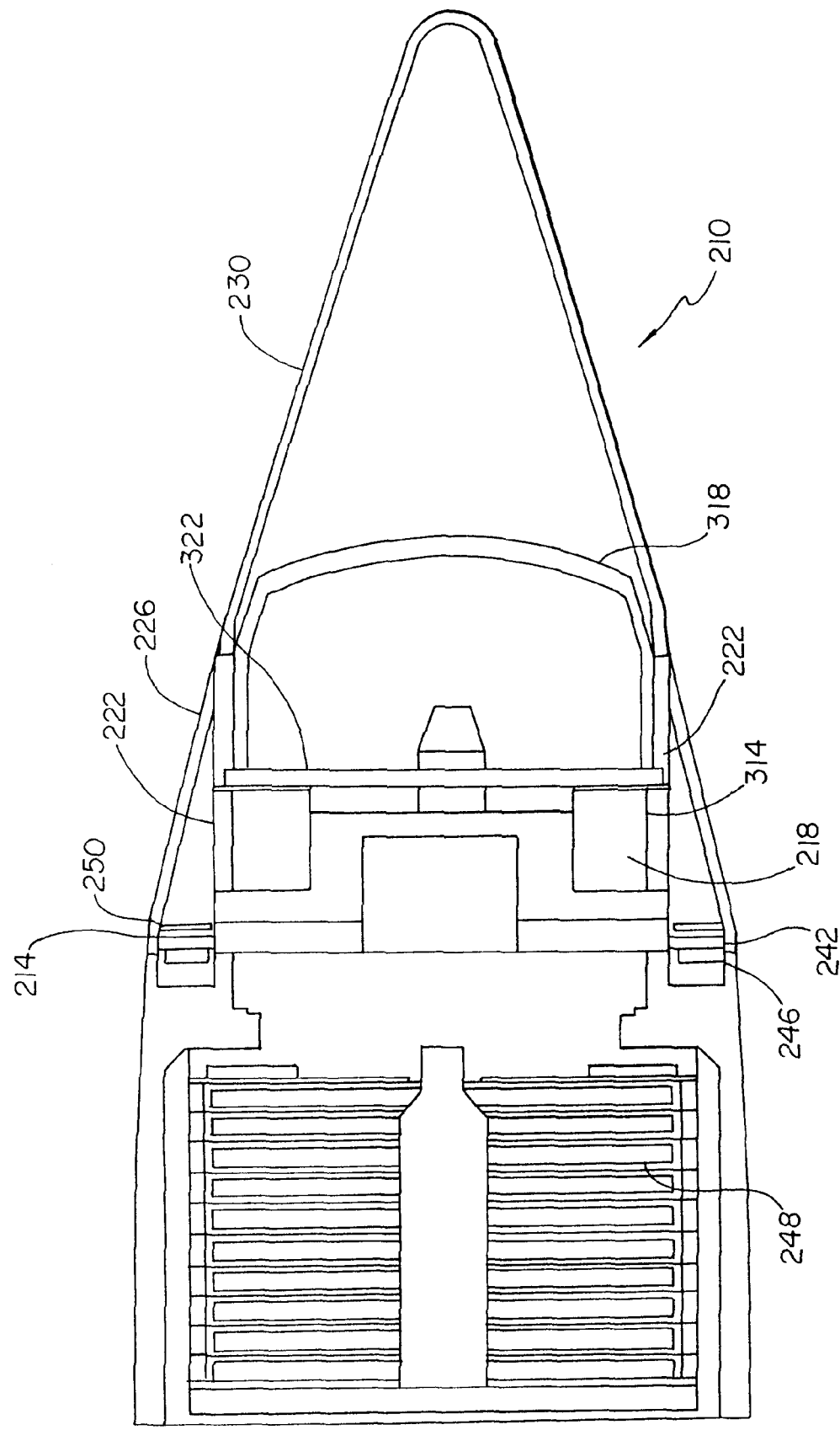
FIG. 2 shows a side cross-sectional view of an inventive dual mode sensor.
Figure 3:
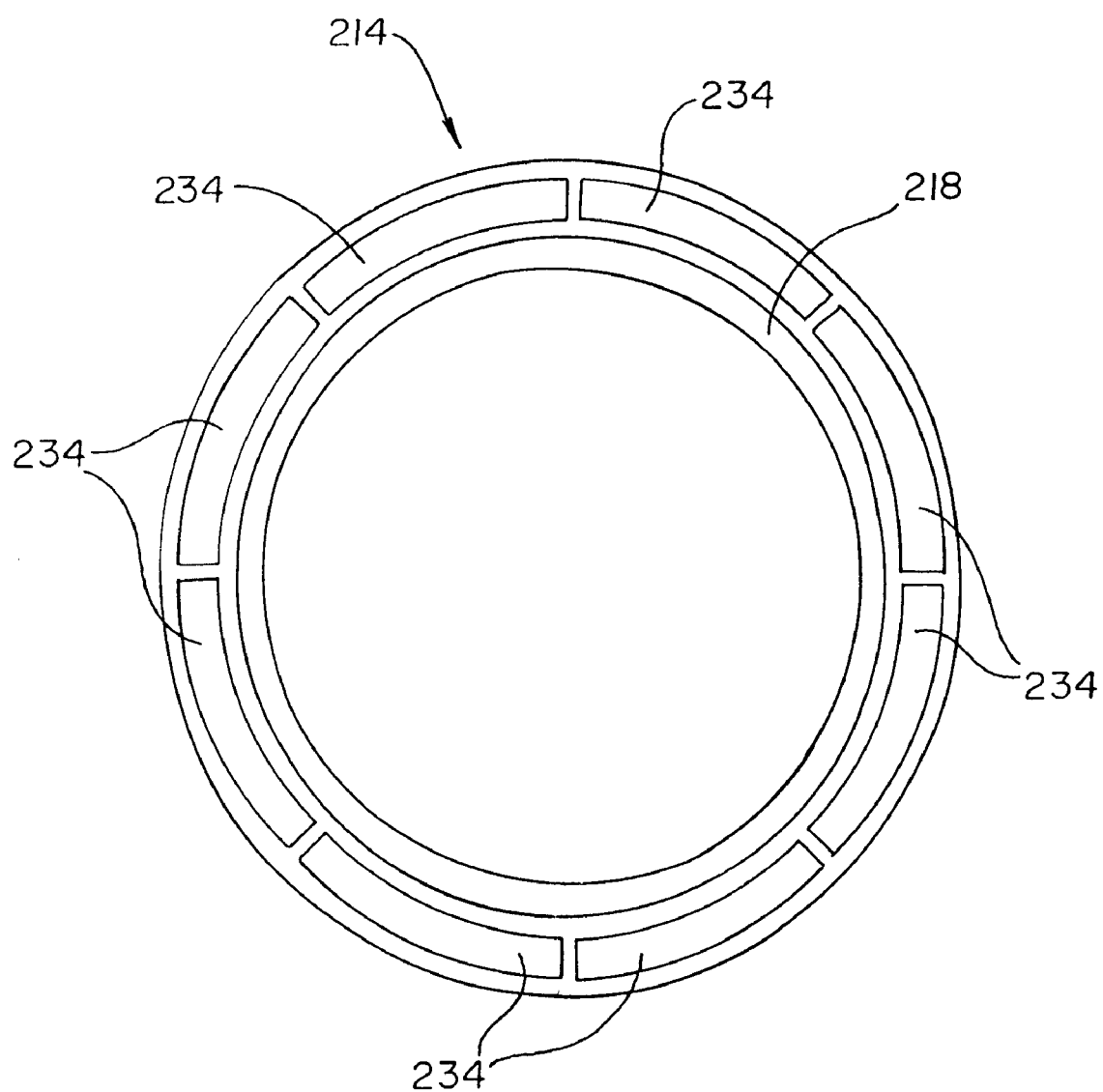
FIG. 3 shows a front elevational view of an optical sensor for use in the present invention.

In one embodiment, as shown in FIGS. 2 and 3, the sensor system operates as a dual mode sensor, further comprising an rf sensor. The dual mode sensor shown generally at 210, comprises an inventive optical sensor comprising optical detector units 234 arranged in a substantially annular shape, shown generally at 214, mounted coaxially about an rf sensor, shown generally at 218. The dual mode sensor further comprises a light blocking device 222 constructed and arranged for blocking optical energy from one or more of the optical detector units 234 comprising the substantially annular optical detector units 214. As depicted, light blocking device 222 is mounted coaxially with rf sensor 218. In a preferred embodiment, light blocking device 222 is reflecting and reflects impinging optical energy onto one or more of the optical detector units forming substantially annular optical detector 214.

Each optical detector unit 234, in addition to the detector, further comprises a circuit board 242 for conditioning the signal output by the detector and preamps 246 for amplifying the optical detector output signal.

A signal processor 248 operably associated with the optical detector units 234 (including circuit boards 242 and preamps 246) receives the optical detector output signals from the optical detector units as well as from rf sensor 218 and provides a guidance signal to the guidance system of the munition.

The inventive sensor optionally further comprises optional optical filters 250, as are known in the art, mounted over the optical detector units 234 forming substantially annular optical detector 214. Optical filter 240 is a narrow band-pass filter designed to pass optical energy within a narrow range about the desired optical frequency (i.e. the frequency of the illuminator used to illuminate the target). Desirably, the optical filter will pass optical energy within an approximately 15–20 n range about the optical wavelength to be detected and filter out optical energy of other wavelengths. Optical filter 240 may be bonded directly to the detectors or otherwise mounted in front of the optical detector units.

The optical sensor may further comprise an optional optically transparent radome 226, mounted over substantially annular optical detector units 214 as well as an rf transparent radome 230 mounted forward of the rf detector.

Substantially annular optical detector units 214, as shown in front elevational view in FIG. 3, is formed of a plurality of optical detector units 234 arranged in a segmented ring coaxially about the rf sensor as seen best in FIG. 3. An even number of such detectors is desirable and four or more optical detector units are preferred. With additional detectors, higher accuracy measurements may be obtained. The detectors are symmetrically disposed in the segmented ring and are arranged such that for every detector, there is a paired detector situated across the ring from it. In the optical sensor shown in FIG. 3, eight detectors are present.

Although it is preferred that the optical detector units be arranged in an annulus, other shapes approaching an annulus are contemplated as well including a hexagon and other polygonal arrangements.

Figure 4:
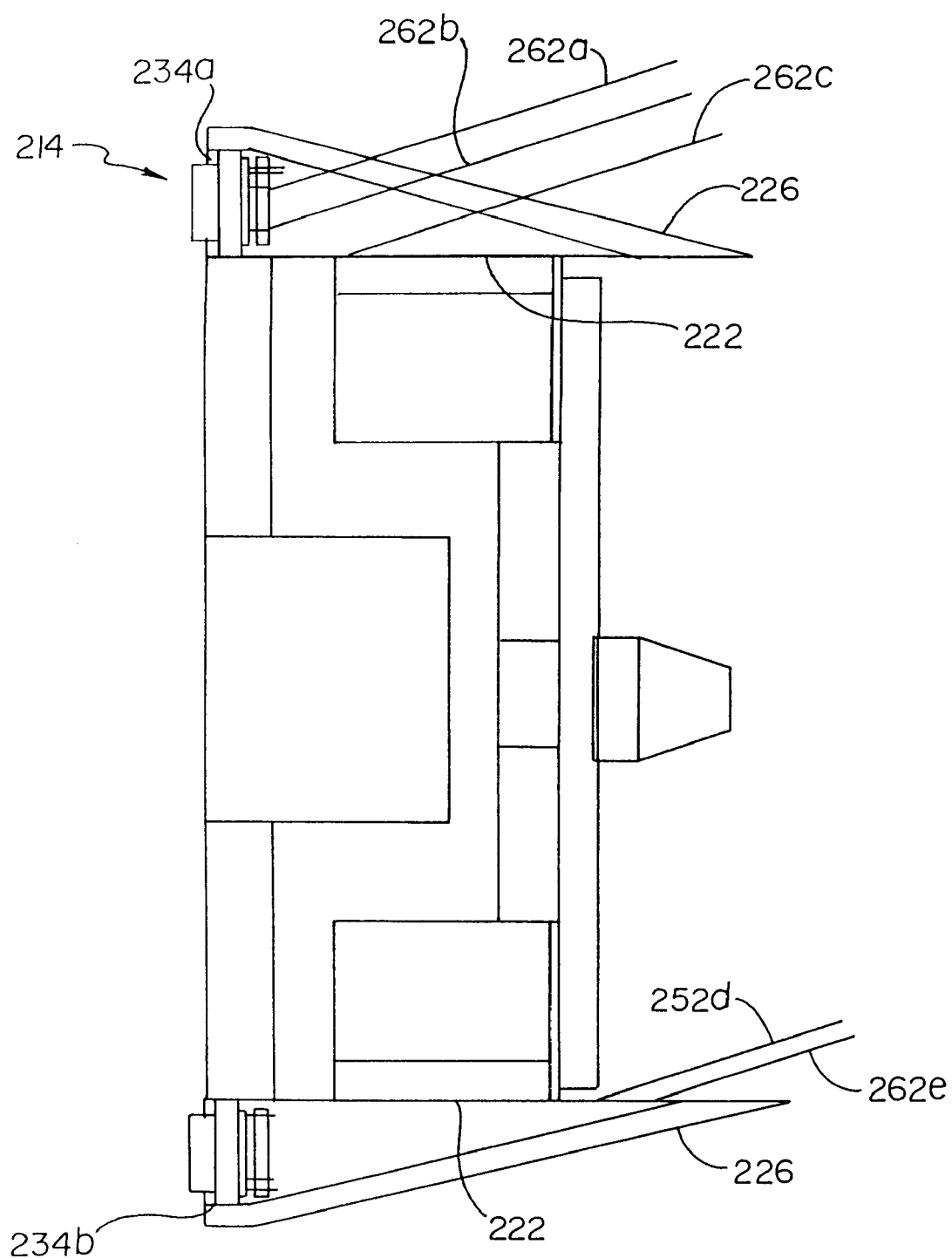
FIG. 4 is a cross-sectional view of an optical sensor for use in the present invention showing a ray-trace of optical beams of a given angle impinging on the inventive dual mode sensor.

The operation of the inventive optical sensor including substantially annular optical detector units 214 is shown in FIG. 4. A target is illuminated with beams of optical energy by a remote illumination device such as a laser. The beams are scattered by the target, and some of the scattered optical energy is detected by the optical sensor. A portion of the scattered optical energy arrives at substantially annular optical detector units 214 as substantially parallel beams of optical energy 262a–e and disposed at a given angle relative to the longitudinal axis of the munition extending through the center of substantially annular optical detector 214. Although the optical energy is actually scattered by the target, the beams that are seen by the optical detector units when the detectors are at any significant distance from the target (i.e. where the distance between the sensor and the target is greater than several multiples of the diameter of the annulus of detectors) are substantially parallel. Beams 262 are then detected by pairs of oppositely disposed optical detector units 234. Considering one such pair of oppositely disposed optical detector units 234a and 234b, incoming parallel beams 262a,b are detected directly by optical detector unit 234a. Incoming beam 262c, although reflected by reflector 222 is also detected by optical detector unit 234a. Parallel beams 262d,e are not, however, detected by oppositely disposed optical detector unit 234b being blocked by light blocking device 222. As such, if a target is at a positive angle relative to the optical detector units, more optical radiation will be detected by optical detector unit 234a than by optical detector unit 234b. Of course, as the magnitude of the angle of the incoming optical radiation approaches 0°, optical detector unit 234b will begin to detect optical radiation. If the target is head-on, that is, at a 0° angle relative to the longitudinal axis extending through the center of substantially annular detectors 214, optical detector units 234a,b will detect equal amounts of optical radiation resulting in a null difference signal and a positive sum signal. This combination of a positive sum signal and zero difference signal helps distinguish between a target that is head-on and the absence of a target. Finally, if the target is at a negative angle relative to the longitudinal axis extending through the center of substantially annular detectors 214, optical detector unit 234b will detect more optical radiation than optical detector unit 234a. The difference in optical radiation detected by each pair of oppositely disposed optical detector units may then be analyzed to yield the location of the target.

Rf sensor 218 as shown in FIG. 2, comprises transceiver 314, transreflector 318, twist reflector 322 and optionally, rf radome 230. Transceiver 314 serves as a combination of an rf transmitter for transmitting rf signals to a target and rf receiver for receiving signals reflected off of the target. In use, transceiver 314 forms linearly polarized rf energy in a well-known manner. Because of the polarization of the rf energy relative to transreflector 318, the rf energy is collimated by transreflector 318 and reflected toward twist reflector 322. Transreflector 318 comprises a grid of parallel wires shaped so as to be able to collimate impinging rf energy of the appropriate polarization. Twist reflector 322 then shifts the phase of the reflected rf energy by ninety degrees and reflects the rf energy back towards transreflector 318. With the polarization shift, the collimated rf energy is transmitted through transreflector 318 and toward a target.

At least a portion of the polarized rf energy impinging the target is reflected back from the target, traversing transreflector 318 and impinging on twist reflector 322 where its polarization is again shifted by ninety degrees. The rf energy is reflected onto transreflector 318 which in turn focuses and reflects the rf energy on transceiver 314. Transceiver 314 includes a receiver for analyzing the return signal.

Although in a preferred embodiment, the rf sensor is configured to work in a conical scanning (con-scan), monopulse mode as is known in the art, the present invention is not intended to be limited to such an rf sensor. Other rf sensors, as are known in the art, may be used in conjunction with an optical detector in the practice of the present invention.

In general, the rf sensor, or more specifically, twist reflector 322 and transreflector 318 are mounted forward of substantially annular optical detector 214. Although in most applications, and as depicted in FIG. 2, substantially annular optical detector 214 is adjacent to and behind twist reflector 322 in the tip of the munition, substantially annular optical detector units 214 may be set further back in the body of the munition, depending on the shape of the munition and aerodynamic and other considerations.

Figure 5:
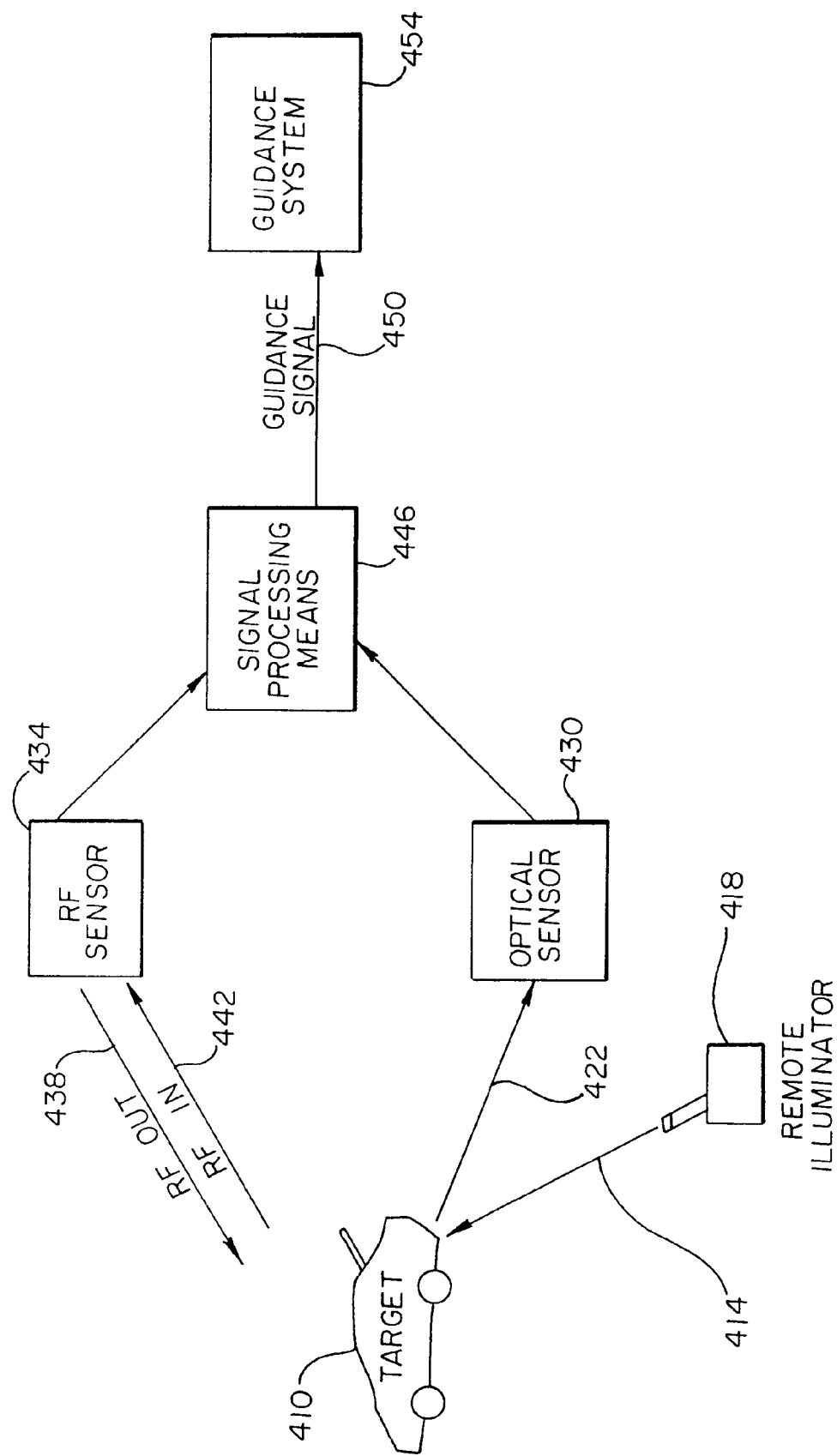
FIG. 5 is a block diagram of the inventive dual mode sensor in use.

In use, as shown in FIG. 5, a target 410 is illuminated with a beam of optical radiation 414 such as from remote illuminator 418. At least a portion 422 of optical radiation 414 reflected by target 410 is received by optical sensor 430. Similarly, rf sensor 434 transmits polarized rf energy 438 toward target 410. At least a portion 442 of rf energy 438 is reflected back to rf sensor 434. The detected rf and optical signals are processed in a signal processor 446 which outputs a guidance signal 450 to a guidance system 454 which guides the munition.

While the reflector is coaxial with the rf sensor, at least a portion of the reflector may be mounted concentrically about at least a portion of the rf sensor. Similarly, at least a portion of the optical sensor may be mounted concentrically about at least a portion of the rf sensor.

The preferred optical detector units for use with the present invention are silicon based detectors such as those manufactured by EG&G and Centronics which detect optical radiation between the wavelengths of about 200 $\mu$m to about 1100 nm. Of course, suitable optical detector units made from other materials, operating at other frequencies may also be used in conjunction with target illuminating devices operating at other wavelengths.

The target illuminator used in conjunction with the optical sensor produces optical radiation in a wavelength range detectable by the optical sensor. Where silicon detectors are used, the preferred target illuminator operates at a wavelength of 200 nm to 1100 nm. More desirably, the target illuminator will output energy of wavelength of about 1000 nm.

Although arc shaped optical detector units are preferred, as shown in FIG. 3, other shaped optical detectors units may be used as well including rectangular optical detector units. In general, as the number of optical detectors units decreases, it is more desirable to have arc segment optical detector units. In a preferred embodiment, eight silicon arc shaped optical detector units are employed. Each optical detector unit consists of two silicon arc shaped optical detector units slaved together to form one unit with one output signal.

The preferred rf detectors for use with the present invention operate in the mmw range and more specifically, in a frequency range of from about 30 GHz to about 150 GHz.

The signal processor and guidance system may be any suitable device as known in the art, whether in existence or yet to be invented.

From the foregoing, it should be appreciated that the invention combines 1) an active mmw sensor that transmits energy toward a target and receives the reflected energy and 2) an unfocused optical sensor that receives electromagnetic radiation in the optical range reflected from the target such as by a remote illuminator.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is as follows:

1. A sensor for use with a guidance system of a munition, the munition having a front end and a rear end, and a longitudinal axis therethrough, the sensor mounted on the munition and comprising:

a plurality of optical detector units disposed about a common point along the longitudinal axis and substantially equidistant from the common point to receive incoming optical energy from a target source of optical energy, each optical detector unit on receiving incoming optical energy producing an optical detector output signal, one or more light blocking devices arranged in a substantially circular shape around the longitudinal axis and coaxial with the plurality of optical detector units and at least a portion of the one or more light blocking devices situated forward of the optical detector units, the one or more light blocking devices closer to the longitudinal axis than the optical detector units, the one or more light blocking devices constructed and arranged so as to block at least a portion of any incoming optical energy propagating in a direction oblique to the longitudinal axis, from one or more of the optical detector units; and a signal processor operably associated with the optical detector units to receive the optical detector output signal(s) and provide a guidance signal to the guidance system.

2. The sensor of claim 1 wherein the one or more light blocking devices are reflecting and are arranged so as to reflect impinging optical energy onto at least one or more of the optical detector units.

3. The sensor of claim 1 wherein the optical detector units are symmetrically disposed about the common point.

4. The sensor of claim 1 comprising an even number of optical detector units, each optical detector unit oppositely disposed about the common point from a second optical detector unit.

5. The sensor of claim 1 further comprising an rf sensor to receive rf energy and produce an rf sensor output signal, the signal processor operably associated with the rf sensor to receive the rf sensor output signal and provide a guidance signal to the guidance system.

6. The sensor of claim 5, the rf sensor further comprising a transreflector and a twist reflector, wherein the plurality of optical detector units are mounted on the munition coaxially with and exterior to the transreflector and a twist reflector, about the longitudinal axis of the munition.

7. A dual mode optical and radio frequency (RF) sensor system for use with a guidance system of a munition, the munition having a longitudinal axis therethrough, the sensor system mounted on the munition and comprising:

(a) an rf sensor to receive rf energy and produce an rf sensor output signal;

(b) an optical sensor comprising
      i) a plurality of optical detector units mounted about the longitudinal axis to receive optical energy and produce optical detector output signal(s);
      ii) a reflector constructed and arranged to direct optical radiation outward to the optical detector units, the reflector mounted coaxially with the optical detectors about the longitudinal axis on the munition;

the sensor system further comprising (c) a signal processor operably associated with the rf sensor and the optical sensor to receive the rf sensor output signal and the optical detector output signal(s) and provide a guidance signal to the guidance system.

8. The dual mode sensor system of claim 7 wherein the optical sensor comprises a plurality of optical detector units arranged in a segmented ring about the longitudinal axis.

9. The dual mode sensor system of claim 8 further comprising an optically transparent radome mounted on the munition over the optical sensor.

10. The dual mode sensor system of claim 8 wherein the reflector is mounted on the munition concentrically with and interior to the segmented ring about the rf sensor.

11. The dual mode sensor system of claim 8 wherein at least a portion of the rf sensor is mounted forward of and closer to the longitudinal axis than the plurality of optical detector units.

12. The dual mode sensor system of claim 8 having four or more optical detector units.

13. The dual mode sensor system of claim 8 having an even number of optical detector units.

14. The dual mode sensor system of claim 8 wherein the optical detector units are symmetrically disposed in the segmented ring.

15. The dual mode sensor system of claim 7 wherein the rf energy has a frequency of between about 30 GHz to about 150 GHz.

16. The dual mode sensor system of claim 7 wherein the optical detector detects a beam of optical radiation reflected from a target.

17. The dual mode sensor system of claim 7 wherein the munition is a bullet.

18. The dual mode sensor system of claim 7 wherein the munition is a missile.

19. The dual mode sensor system of claim 7 wherein the rf sensor further comprises an rf transmitter for illuminating a target with rf energy.

20. The dual mode sensor system of claim 19 wherein at least a portion of the rf energy illuminating the target is reflected and detected by the rf sensor.

21. A dual mode optical and radio frequency (rf) sensor system for use with a guidance system of a munition, the munition having a longitudinal axis, the sensor system mounted on the munition and comprising:

(a) an rf sensor to receive rf energy and produce an rf sensor output signal;

(b) an rf transparent radome mounted over the rf sensor and coaxial with the rf sensor;

(c) an optical sensor comprising:
i) a plurality of optical detector units arranged in an annulus mounted about the longitudinal axis to receive optical frequency energy from a target source of optical energy, the optical detectors producing optical detector output signal(s) on receiving optical frequency energy,
ii) optional narrow band-pass filters associated therewith to selectively pass optical energy of a desired frequency;
(iii) an annular optically transparent radome mounted over the optical sensor and coaxial with the optical sensor;
(iv) a reflector constructed and arranged to direct optical radiation outward to the optical detector units, the reflector mounted coaxially with the plurality of optical detector units about the longitudinal axis, the reflector mounted within the optical radome;

the sensor system further comprising (f) a signal processor operably associated with the rf sensor and the annular optical sensor to receive the rf sensor output signal and the optical detector output signal(s) and provide a guidance signal to the guidance system.

22. The sensor of claim 21, the rf sensor further comprising a transreflector and a twist reflector, the optical detector units and the reflector mounted on the munition coaxially with the transreflector and twist reflector and at a further distance from the longitudinal axis than the transreflector and twist reflector.

23. A method of detecting a target through the simultaneous use of both rf energy and optical energy comprising the steps of:
illuminating a target with optical energy, the target reflecting at least a portion of the optical energy;
illuminating the target with rf energy, the target reflecting at least a portion of the rf energy;
detecting the reflected rf energy with an rf sensor;
detecting the reflected optical energy with an optical sensor comprising a plurality of optical detector units arranged in a segmented ring about a common point, the plurality of optical detector units coaxial with at least a portion of the rf sensor, and a reflector constructed and arranged to direct optical radiation outward to the detectors, the reflector mounted coaxially with the plurality of detectors.

24. The method of claim 23 wherein the rf sensor detects rf in the frequency range of about 30 GHz to about 150 GHz.

25. A sensor for use with a guidance system of a munition, the munition having a longitudinal axis, the sensor mounted on the munition and comprising:
a plurality of optical detector units disposed about a common point along the longitudinal axis to receive incoming optical energy, each of the optical detector units producing an optical detector output signal on illumination with optical energy, the detectors situated at a first distance from the longitudinal axis;
a light blocking device arranged around the common point and situated interior to the detectors, the light blocking device constructed and arranged so as to block at least a portion of any incoming optical energy propagating in a direction oblique to the longitudinal axis, from at least one of the detectors; and
a signal processor operably associated with the optical sensor to receive the first output signal and provide a guidance signal to the guidance system.

26. The sensor of claim 25 wherein the light blocking device is reflecting and reflects at least a portion of any impinging optical energy onto at least one detector unit.

27. The sensor of claim 26 wherein the light blocking device comprises alternating regions of reflecting and non-reflecting material.

28. The sensor of claim 26 further comprising an rf sensor to receive rf energy and produce an rf sensor output signal, the signal processor operably associated with the rf sensor to receive the rf sensor output signal and provide a guidance signal to the guidance system.

29. A sensor for use with a target measurement system having a longitudinal axis, the sensor mounted on the target measurement system and comprising:
a plurality of optical detector units disposed about a common point along the longitudinal axis to receive incoming optical energy, each detector unit producing an optical detector output signal on illumination with optical energy, the detectors situated at a first distance from the longitudinal axis;
one or more light blocking devices arranged in a substantially circular shape around the common point the one or more light blocking device closer to the longitudinal axis than the plurality of optical detector units, the one or more light blocking devices constructed and arranged so as to block at least a portion of any incoming optical energy propagating in a direction oblique to the longitudinal axis, from one or more of the optical detector units; and a signal processor operably associated with the optical detector units to receive the optical detector output signals and provide a target measurement signal to the target measurement system.

30. A sensor for use with a guidance system of a munition, the munition having a front and rear ends and a longitudinal axis, the sensor mounted on the munition and comprising:

a plurality of optical detector units disposed in a plane which is perpendicular to the longitudinal axis, the optical detector units spaced along the circumference of a circle having a first radius, to receive incoming optical energy from a target source of optical energy and produce a first output signal;

a cylindrical light blocking device arranged coaxially with the plurality of optical detector units about the longitudinal axis and having a second radius which is less than the first radius, the cylindrical light blocking device extending forwardly from the plurality of optical detector units and blocking light from being received by any of the plurality of optical detector units directly in line with the light on the opposite side of the cylindrical light blocking device, and a signal processor operably associated with the optical detector units to receive the optical detector output signal(s) and provide a guidance signal to the guidance system.

* * * * *

UNITED STATES PATENT AND TRADEMARK OFFICE
CERTIFICATE OF CORRECTION

PATENT NO. : 6,060,703
DATED : May 9, 2000
INVENTOR(S) : Clarence C. Andressen

Page 1 of 1

It is certified that error appears in the above-identified patent and that said Letters Patent is hereby corrected as shown below:

Column 5,
Line 31, delete "n range" and insert -- nm range --;

Column 7,
Line 24, delete "μm" and insert -- nm --.

Signed and Sealed this

Thirty-first Day of July, 2001

Attest:

*Attesting Officer*

NICHOLAS P. GODICI
*Acting Director of the United States Patent and Trademark Office*